Patented Aug. 25, 1936

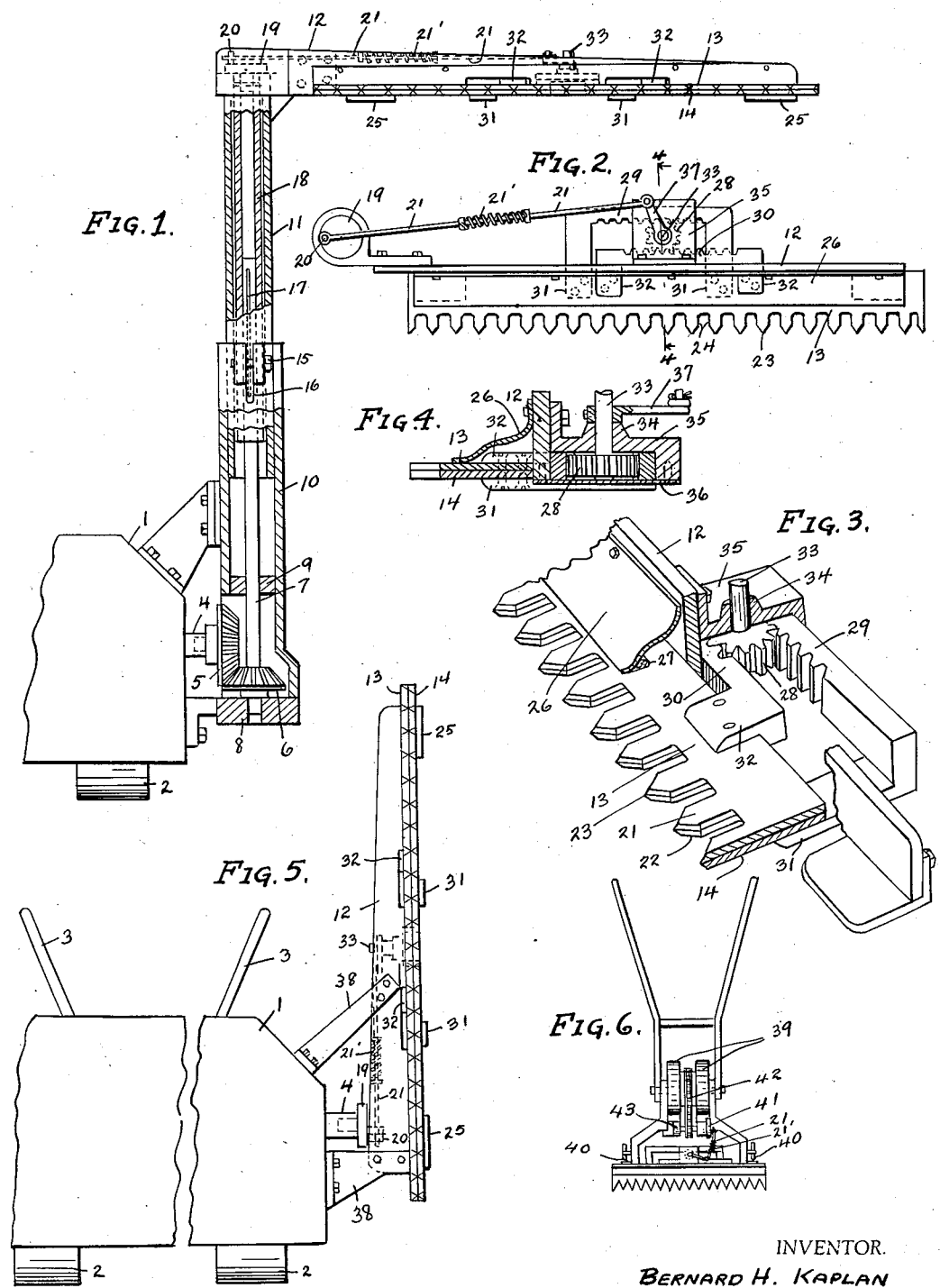

2,051,862

UNITED STATES PATENT OFFICE 2,051,862

HEDGE AND LAWN CLIPPER

Bernard H. Kaplan, Fairfax, Calif.

Application January 28, 1935, Serial No. 3,691

8 Claims. (Cl. 56—237)

This invention relates to apparatus for clipping hedges and lawns and has for its objects improvements in such apparatus in which double reciprocating blades are used so as to effectively trim or clip the heavy twigs of a hedge and a mounting and means of operating the blades on a power mower whereby the side of the hedge or the top of the hedge may be quickly clipped to a flat surface, also such an apparatus in which the blades may be raised or lowered to suit hedges of various heights, also a blade action and construction with a cutter using two flat saw-steel blades working against one another and which may easily be removed for sharpening, also such a construction which is valuable for use in cutting grass. Other features of advantages will appear in the following description and accompanying drawing.

In the accompanying drawing Fig. 1 is vertical end elevation of my apparatus mounted on a power mower arranged to clip the top of a hedge, parts of the apparatus being shown in section to show the internal construction.

Fig. 2 is a plan view of the cutter and its supporting and driving connections.

Fig. 3 is an enlarged fragmentary perspective view showing the blades and driving pinion.

Fig. 4 is an enlarged cross section of Fig. 2 taken along the line 4—4 thereof.

Fig. 5 is an elevation showing my reciprocating blade assembly mounted in vertical position on the side of a power mower for clipping the side of a hedge.

Fig. 6 is a plan view showing the adaptation of my reciprocating blade assembly to a manually operated lawn mower.

Briefly stated, my invention comprises a special reciprocating toothed blade assembly and its operative mounting. For hedge clipping the blade assembly is mounted on the side of portable power plant either gasoline or electric driven, such as provided in most any of the power lawn mowers, and in detail not particularly concerned with the present invention except that it should have an available projecting power shaft at one side for operating my blades.

In the drawing the power mower or other portable power plant is indicated at 1, its ground rollers being shown at 2, and, when used, its guiding handles as at 3.

It will, of course, be understood that the power plant may be of almost any design as it is not a part of the present invention except in broad combination to supply the power, and whether a man guides it by handles, or rides on it, or whether it is propelled by any particular form of power, is immaterial, though if a conventional power lawn mower is used as the portable power plant or tractor, its lawn cutting blades will of course be lifted or removed.

The portable power plant should have a power shaft 4 projecting from its side provided with the usual controls (not shown) for starting or stopping it at will, and when using the apparatus for clipping the top of the hedge as in Figs. 1 and 2, the shaft 4 will have a bevel gear 5 secured to its free end. This gear 5 meshes with a smaller bevel gear 6 mounted on a vertical shaft 7 supported in bearings 8, 9 carried in a vertical tubular housing 10 detachably bolted to the power plant as indicated.

Extending upwardly from within housing 10 is a cylindrical upper housing or extension column 11 which is vertically slidable in the lower housing and carries at its upper end a horizontally extending arm 12 detachably secured thereto and which supports the flat cutting blades 13, 14 and their reciprocatory driving connection. Column 11 may be rigidly clamped at any point of extension in housing 10 by means of a clamping bolt 15 near the upper end of the housing which is provided with lugs to receive the bolts and is split as at 16 to provide the slight clamping flexibility.

Vertical shaft 7 is splined as at 17 and telescopically fitting over it is a tubular extension shaft 18 passing upward through a bearing surface at the upper end of column 11 and fitted on top with a small crank disk 19 provided with a crank pin 20 to which the driving rod 21 for the blades is pivoted.

The blades 13 and 14 are two flat pieces of saw steel lying one upon the other and formed with matching teeth 21, 22 along their forward edges and sharpened at both sides. The form of the teeth for hedge clipping purposes is preferably as shown in Fig. 2 and wherein the tips 23 of the teeth are pointed and the spaces 24 are defined by substantially parallel walls, so that as the blades are advanced and rapidly reciprocated, the hedge twigs will be warded into the openings to both sides of the points and by reason of the substantially parallel sides of the opening the twigs will not be ejected during the cutting action if the blades are slightly dull.

The blades are of the same size and shape, merely being reversed with respect to their beveled sharpened edges and placed one on top of the other with the lower one resting on bearing pads 25 bolted to the supporting arm 12, and the blades are resiliently pressed together by means of a long thin spring metal bowed plate 26 adjustably bolted (as in loose holes) to arm 12, an oiling pad strip 27 being advantageously positioned at the rear of the edge of the plate pressing on the upper blade. It is of course also understood that oil absorbent plugs or graphite depressions, not shown, may be inserted at random on the rubbing surfaces of the blades to facilitate keeping these surfaces as well as the surfaces of the pads 25 lubricated, also that the pads 25 may be of any length or substantially continuous if desired, and also that any desired lubricating channels or oil cups may be provided where desired.

The blades thus far described are resiliently held against one another, and with their rear edges against the forward finished surface of arm 12, and which provisions resist all stresses brought upon them during use. However, the blades are also prevented from being pulled out forwardly by the reciprocatory drive construction now to be described.

The reciprocatory drive comprises a pinion gear 28 engaged at opposite sides of its diameter with rack bars 29, 30 carried respectively by the two blades. Rack bar 29 is mounted on or formed with a pair of lugs 31 welded, riveted or screwed to the lower blade 14, while rack bar 30 is similarly made with lugs 32 secured to the upper blade 13, while the supporting bar 12 is finished and extends down in front of rack bar 30 thus locking blade 13 against forward removal, the pinion 28 of course preventing the lower blade from coming out.

The pinion has a hub or stub shaft 33 revolvably supported in a bearing 34 in a rack covering plate 35 bolted to supporting arm 12, and the pinion is covered below by a plate 36 held by screws at its edges to the lower edges of the arm 12 and plate 35.

The hub 33 of the gear is provided with a small crank 37 to which the outer end of pitman rod 21 is pivoted. Rod 21 is preferably provided with a spring section 21' or its equivalent so that it will yield in either direction in case a nail or stone got between the teeth of the blades while cutting. With the construction shown and explained the pinion and racks are enclosed and may therefore run in grease.

In operation, the portable power plant is guided along the hedge to be trimmed, either under power or manually, depending on the completeness of the portable power plant or tractor, while the clipper power shaft 4 is set in motion. The speed of the shaft 4, size of the crank throw, etc., are all proportioned to yield a high rate of reciprocatory motion to the blades so that they will cut off the thickest twigs entering between their teeth. Plate 26 covers up the operative parts to a great extent so as to force most of the cuttings over the top of the bar 12.

When used to clip the vertical side of the hedge, bar 12 and its blade assembly are unbolted from column 11, and the latter as well as housing 10 are removed. Gear 5 is replaced with crank disk 19 or its equivalent, and the arm 12 is positioned vertically and bolted to suitable lugs and braces 38 to the power plant as indicated in Fig. 5. For very high hedges, extra long blades may be used.

The same blade assembly made much smaller and shorter may be used as a lawn clipper by mounting in front of a pair of traction wheels 39 as shown in Fig. 6, suitable auxiliary supporting rollers 40 also being provided. In this case the pitman rod 21 is operated by a crank 41 in turn revolved by a chain 42 passing over a sprocket carried by one of the traction wheels, and a one-way clutch is provided at 43 so that the blades will only operate when pushing forward.

Having thus described my invention it will be seen that I have provided a very flexible machine which is well adapted for the several uses mentioned, also that while I have illustrated the one manner of carrying my invention into practice, it is evident that many modifications in the details of construction may be made without departing from the spirit of the invention as may fall within the scope of my appended claims.

I claim:—

1. In a clipper of the character described, a pair of elongated clipping blades with teeth formed along one edge, said blades arranged in superimposed relation, means supporting and guiding the blades for longitudinal movement on one another, and means for reciprocating said blades including racks carried respectively by the blades and a pinion engaged at opposite sides respectively with said racks, a crank on said pinion, a pitman connected to said crank and power means for oscillating the pitman.

2. In a construction as specified in claim 1, said pitman including a spring section arranged and adapted to yield upon the teeth of the blade embracing a nail or stone.

3. In a clipper of the character described, a pair of elongated clipping blades with teeth formed along one edge, said blades arranged in superimposed relation, means supporting and guiding the blades for longitudinal movement on one another, means for reciprocating said blades including racks carried respectively by the blades and a pinion engaged at opposite sides respectively with said racks, and means for resiliently holding said blades in contact.

4. In a construction as defined in claim 3, the means for resiliently holding the blades in contact comprising a long sheet of metal spring bearing against one blade and forcing it toward the other.

5. In a clipper of the character described, a pair of elongated clipping blades with teeth formed along one edge, said blades arranged in superimposed relation, means for supporting and guiding the blades for longitudinal movement on one another, means for reciprocating said blades including racks carried respectively by the blades, a pinion engaged at opposite sides respectively with said racks, and means substantially enclosing said pinion and rack teeth forming a grease housing.

6. In a clipper of the character described, a pair of elongated clipping blades with teeth formed along one edge, said blades arranged in superimposed relation, means supporting and guiding the blades for longitudinal movement on one another, and means for reciprocating said blades including racks carried respectively by the blades, a pinion engaged at opposite sides respectively with said racks, means for oscillating said pinion including a resilient connection adapted to yield upon the teeth of the blades meeting an unyielding obstruction.

7. In a clipper of the character described, a pair of elongated clipping blades with teeth formed along one edge, said blades arranged in superimposed relation, means supporting and guiding the blades for longitudinal movement on one another and means for reciprocating said blades including racks carried respectively by the blades, a pinion engaged at opposite sides respectively with said racks, the teeth of said blades being pointed at their ends to deflect vegetation to be clipped into both sides of the point, and the spaces between the teeth having substantially parallel cutting sides.

8. In a clipper of the character described, a pair of elongated clipping blades with teeth formed along one edge, said blades arranged in superimposed relation, means supporting and guiding the blade for longitudinal movement on one another, means for reciprocating said blades including racks carried respectively by the blades and a pinion engaged at opposite sides respectively with said racks, a resilient plate bearing against the upper blade to hold the same resiliently against the lower blade, said plate formed as a guard to guide cuttings over said pinion and racks.

BERNARD H. KAPLAN.